United States Patent [19]
Hong et al.

[11] Patent Number: 5,807,011
[45] Date of Patent: Sep. 15, 1998

[54] FOOT SYSTEM FOR JOINTED LEG TYPE WALKING ROBOT

[75] Inventors: Yeh Sun Hong; Chong Won Lee, both of Seoul, Rep. of Korea

[73] Assignee: Korea Institute of Science and Technology, Seoul, Rep. of Korea

[21] Appl. No.: 726,417

[22] Filed: Oct. 7, 1996

[51] Int. Cl.$^6$ ............................ B62D 57/02; G05B 19/00; B25J 11/00

[52] U.S. Cl. .................................. 403/62; 403/53; 901/1; 901/50

[58] Field of Search ........................... 901/1, 50; 403/62, 403/54, 53

[56] References Cited

U.S. PATENT DOCUMENTS

| | | | |
|---|---|---|---|
| 4,834,200 | 5/1989 | Kajita ......................................... | 901/1 X |
| 5,416,393 | 5/1995 | Gomi et al. ............................... | 901/1 X |
| 5,455,497 | 10/1995 | Hirose et al. ............................. | 901/1 X |

OTHER PUBLICATIONS

Adachi, et al., "Study on Underground Space Excavation Machine," Proceedings of the 9th International Symposium on Automation and Robotics in Construction, vol. 2, Jun., 1992.

Brochure of Plustech Oy (Finland).

Hirose, et al., "Design of Prismatic Quadruped Walking Vehicle Titan VI," Proceedings of the Th international Conference on Advanced Robotics, p. 723, 1991.

Shuuje Kajita, et al., "Study of Dynamic Biped Locomotion," Brochure of Mechanical Engineering Lab., Tsukuba, Japan.

Adachi, et al., "Adaptive Gait for Quadruped Walking Robot Using Force Sensor," Proceedings of the International Conference on Intelligent Autonomous Systems, Feb. 1993.

Takanishi, et al., "Realization of Dynamic Biped Walking Stabilized by Trunk Motion on a Sagittally Uneven Surface," IEEE International Workshop on Intelligent Robots and Systems, pp. 323–330, 1990.

Uesuge, et al., "Total System of Advanced Robot for Nuclear Power Plant Facilities," Proceedings of the international Symposium on Advanced Robot Technology, pp. 111–117, Mar. 1991.

*Primary Examiner*—Anthony Knight
*Attorney, Agent, or Firm*—Scully, Scott, Murphy & Presser

[57] ABSTRACT

A foot system for a jointed leg type walking robot which is capable of more stably walking on both even and uneven ground surfaces includes a connection member disposed at a center portion of the foot system and connected to a leg system provided above the same and having a waist joint, a knee joint, and a shank, the connection member being cylindrical, an ankle member being integral with the connection member and below the same, a shock absorber supporting portion member outwardly and integrally extending at the outer surface of the ankle member and having a vertical hole formed therethrough, a shock absorber fixedly inserted into the hole formed in the shock absorber supporting portion member, and front and rear toes pivotally connected to the ankle by a plurality of upper and lower parallel links.

14 Claims, 11 Drawing Sheets

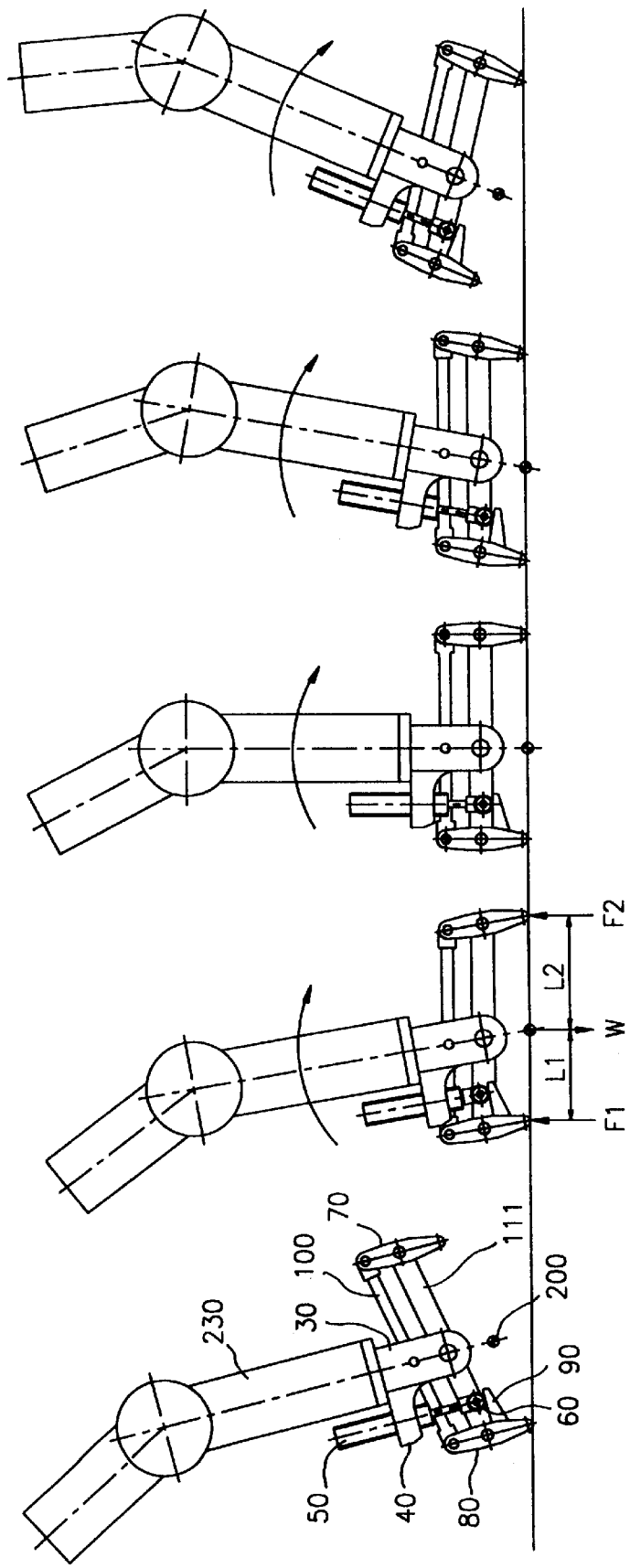

FOOT SYSTEM FOR JOINTED LEG TYPE WALKING ROBOT

BACKGROUND OF THE INVENTION

1. Field of the Invention

The present invention relates to a robotic foot system, and particularly to an improved foot system for a jointed leg type walking robot which is capable of more stably walking on both even and uneven ground surfaces by providing an inventive foot system equipped with a shock absorber, and front and rear toes.

2. Description of the Conventional Art

In the industrial field, the use of robots has increased greatly for handling harmful chemicals, radioactive materials and like tasks which are dangerous to humans. Among the methods of enabling a robot to move upon the ground, a method of using a jointed leg type walking system has been introduced. For the jointed leg type foot system, a flat or circular plate has been used; however the structure of the foot system has not been.

Referring to FIG. 1, there is shown the construction of a conventional jointed leg type walking robot. As shown therein, the robot is provided with a head 1 equipped with a visual sensor 2 mounted at a portion thereof. An upper body 3, an upper portion of which is pivotally connected to a predetermined portion of the head 1, is provided with a pair of arms 4. One end of each arm 4 is pivotally connected to a respective side of the upper body 3 and the other end thereof is pivotally provided with a hand 5. A bottom surface of the upper body 3 is rotatably connected to a lower body 6. A front waist joint 7 is rotatably connected to a front portion of the lower body 6. A rear waist joint 8 is also rotatably connected to a rear portion of the lower body 6. An upper end of each of a pair of front hip joint 9 is pivotally connected to a predetermined portion of the front waist joint 7 and a lower end of each front hip joints is pivotally connected to a front knee joint 10 which in turn is pivotally connected to a front ankle joint 11. Here, each front ankle joint 11 is pivotally provided with a front foot 12, the bottom surface of which is formed for contacting with an even ground surface 17. The rear legs comprise the same structure as the front legs, so a description thereof is omitted.

The problems of the jointed leg type walking robot with such a conventional foot system will now be explained with reference to FIG. 1 and FIGS. 2A through 2D.

To begin with, the robot performs some task in accordance with a control signal outputted from a microcomputer (not shown) mounted at a portion thereof, receiving a visual signal outputted from the visual sensor 2. The walking operation of the robot is also conducted by a combined moving operation of the front/rear waist joints 7 and 8, the front/rear hip joints 9 and 13, the front/rear knee joints 10 and 14, the front/rear ankle joints 11 and 15, and the front/rear feet 12 and 16. Here, since each foot 12, 16 is pivotally connected to a respective ankle joint 11, 15, it is generally required that each of the bottom surfaces thereof are always facing parallel with the even ground surface, so that the stable walking operation without slippage on the ground surface can be achieved.

In addition, FIG. 3 shows an example of the experimental result of the vertical reaction force which was measured when a conventional circular-shaped foot of a jointed leg type walking landed on the ground. It is to be noted that the dynamic peak force is much higher than the static one because the landing shock could be hardly absorbed by the conventional foot system.

As shown in FIGS. 2A through 2D, the conventional foot system has further disadvantages in that the foot can slip easily on uneven ground surfaces due to unstable pointwise contact with it or the foot can be tilted over by the horizontal reaction force on the ground when the body is to be accelerated or decelerated by the knee and hip joints.

SUMMARY OF THE INVENTION

Accordingly, it is an object of the present invention to provide a foot system for a jointed leg type walking robot which overcomes the problems encountered in the jointed leg type walking robot with the conventional foot system.

It is another object of the present invention to provide a foot system for a jointed leg type walking robot which is capable of more stably walking on both even and uneven ground surfaces by providing a foot system equipped with a shock absorber and front and rear toes.

It is still another object of the present invention to provide a foot system for a jointed leg type walking robot by which it is possible to achieve a more stable walking without slippage by effectively absorbing the landing shock.

It is furthermore another object of the present invention to provide a foot system for a jointed leg type walking robot capable of improving the walking condition of the robot by enabling the pitch rotation of the shank with respect to the remote center on the ground surface without using an ankle joint.

To achieve the above objects, there is provided a foot system for a jointed leg type walking robot, which includes a connection member disposed at a center portion of the foot system for being connected to a leg system, said connection member being cylindrical, an ankle member being integral with the connection member below the same, a shock absorber supporting member outwardly and integrally extending from an outer surface of the ankle member and having a vertical hole formed therethrough, a shock absorber fixedly inserted into the hole formed in the shock absorber supporting member, and front and rear toes pivotally connected to the ankle member by a plurality of upper and lower parallel links.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7A through 7E are views illustrating a shock absorbing principle when the foot system for a jointed leg type walking robot according to the present invention lands on a ground surface;

DETAILED DESCRIPTION OF THE INVENTION

Figure 4A:
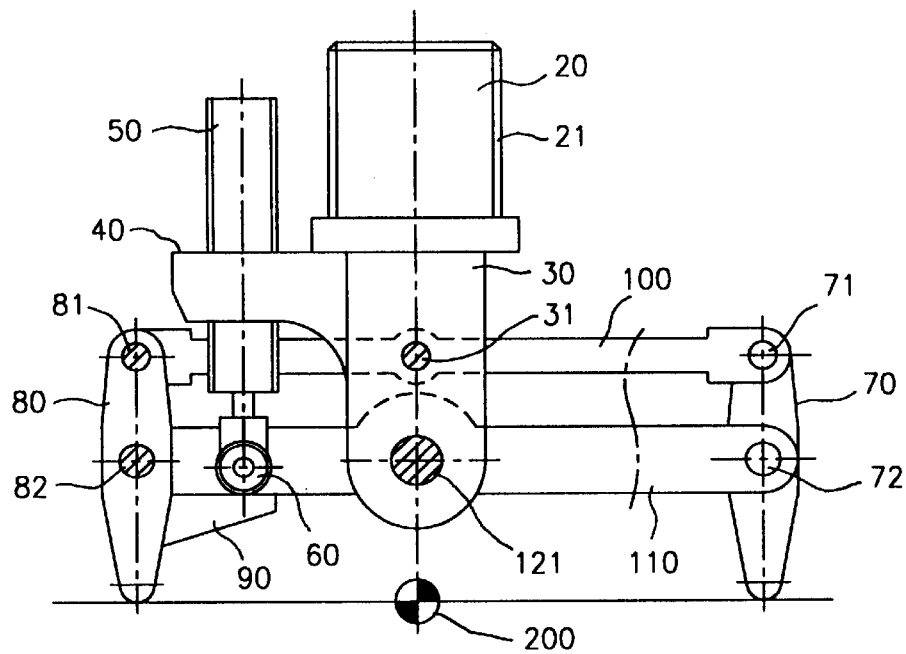
FIG. 4A is a front view of a foot system for a jointed leg type walking robot according to the present invention.
Figure 4B:
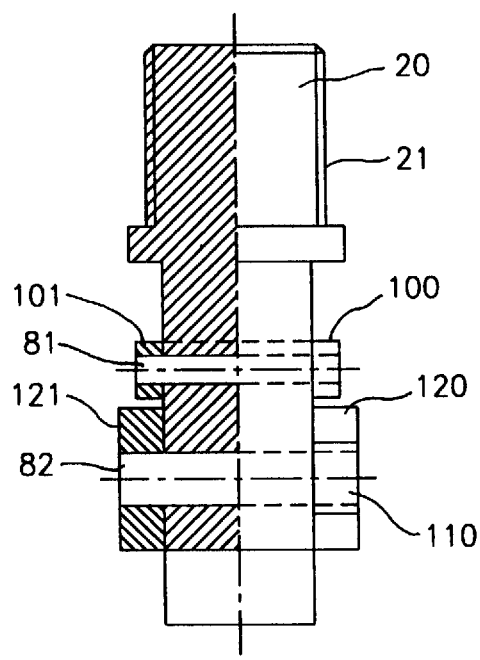
FIG. 4B is a side view of the foot system of FIG. 4A.
Figure 4C:
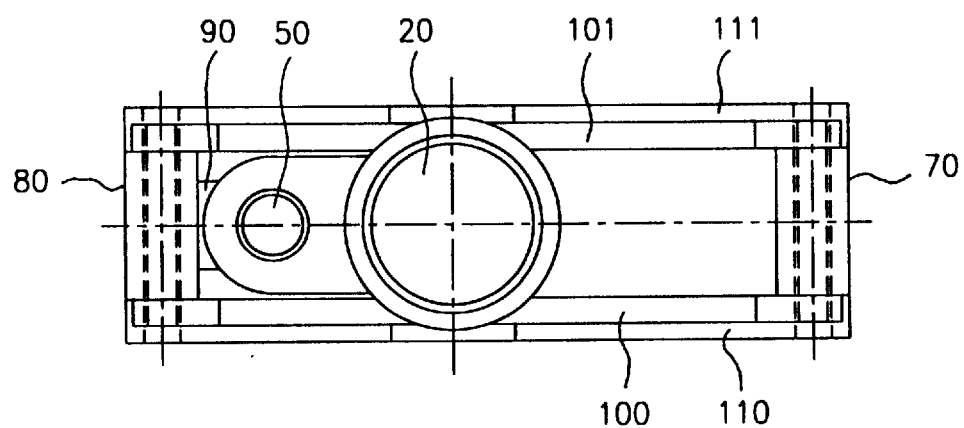
FIG. 4C is a top view of the foot system of FIG. 4A.

FIGS. 4A through 4C show the construction of a foot system for a jointed leg type walking robot according to the present invention. As shown therein, the foot system includes a cylindrical connection portion 20 having an externally thread 21 for mating with an internally threaded end portion of the shank (not shown). An ankle 30 is integrally formed with the lower end of the connection portion 20. The ankle 30 has a horizontal pin 31 pivotally inserted into a hole passing through the upper portion of the ankle 30, and a horizontal pin 121 pivotally inserted into a hole through the lower portion of the ankle 30. A shock absorber supporting portion 40 extends integrally and outwardly from the ankle 30, having a hole into which a shock absorber 50 is vertically and fixedly inserted. The shock absorber 50 is adapted to effectively absorb the shock which occurs when the foot system lands on the ground. A roller 60 is connected to the lower end of the piston of the shock absorber 50.

A front toe 70 is disposed at the front side of the foot system, and a rear toe 80 is disposed at the rear side of the foot system. A pin 71 is pivotally inserted into a hole formed at the upper portion of the front toe 70, and a pin 72 is pivotally inserted into a hole formed at the intermediate portion of the font toe.

A pin 81 is pivotally inserted into a hole formed at the upper portion of the rear toe 80, and a pin 82 is pivotally inserted into a hole formed at the intermediate portion of the rear toe.

An outwardly extending abutment arm 90 having a flat horizontal surface is integrally formed at the intermediate portion of the rear toe 80. Here, the vertical axis of the rear toe 80 and the flat horizontal surface of the abutment arm 90 are perpendicular to one another. The roller 60 slidably contacts with the flat horizontal surface of the abutment arm 90.

A pair of spaced-apart upper parallel links 100, 101 are pivotally connected to the pins 71, 31 and 81. Here, each of the upper parallel links 100, 101 includes a circular support portion 120. In addition, a pair of spaced-apart lower parallel links 110, 111 are pivotally connected to the pins 72, 121, and 82.

In more detail, one end of each of the upper parallel links 100, 101 is pivotally connected to the pin 71 of the front toe 70, the intermediate portion of each of the upper parallel links 100, 101 is pivotally connected to the pin 31 of the ankle 30, and the other end of each of the upper parallel links 100, 101 is pivotally connected to the pin 81 of the rear toe 80. Here, the upper parallel links 100, 101 are parallely spaced apart with respect to the intermediate portion of the ankle 30.

In addition, one end of each of the lower parallel links 110, 111 is pivotally connected to the pin 72 of the front toe 70, the intermediate portion of each of the lower parallel links 110, 111 is pivotally connected to the pin 31 of the ankle 30, and the other end of each of the lower parallel links 110, 111 is pivotally connected to the pin 82 of the rear toe 80. Here, the lower parallel links 110, 111 are parallely spaced apart with respect to the lower portion of the ankle 30.

The operation and effects of the foot system for a jointed leg type walking robot according to the present invention will now be explained with reference to FIGS. 4A through 10.

Figure 5:
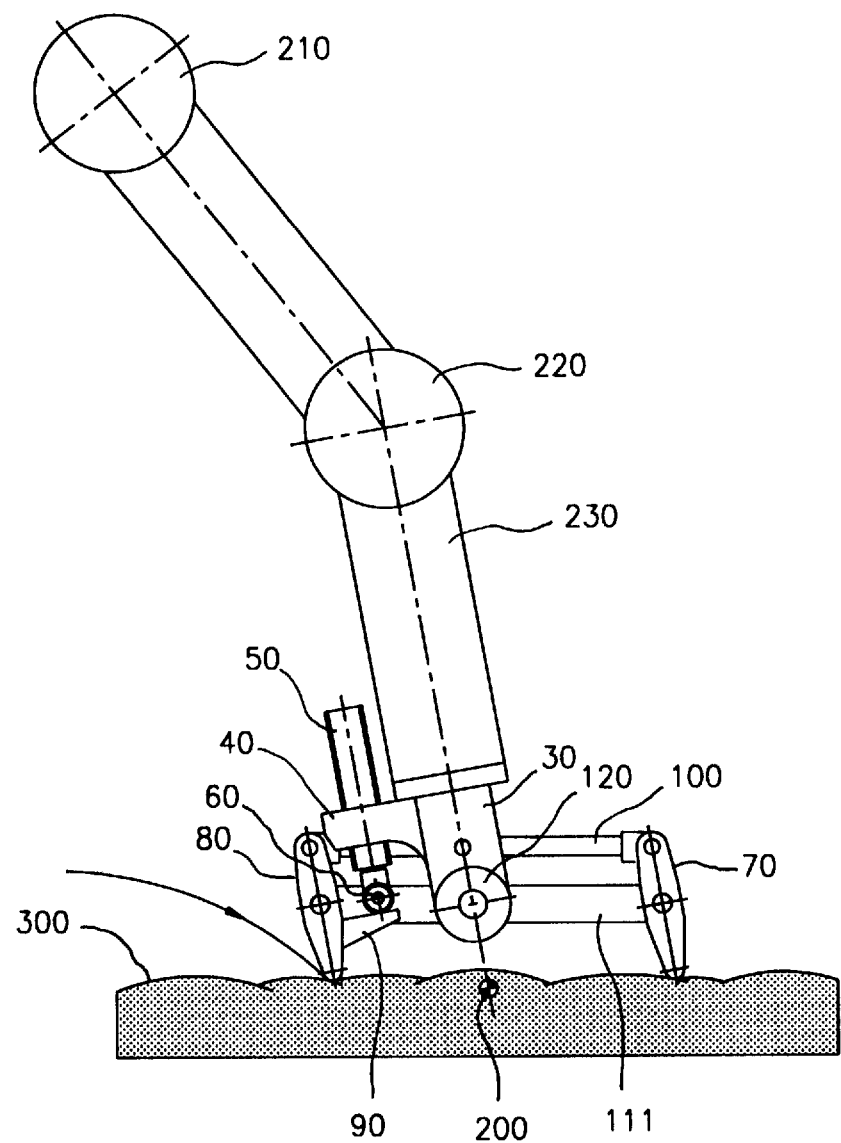
FIG. 5 is a view of the foot and leg system for a jointed leg type walking robot according to the present invention when the foot system lands on an uneven ground surface.

Among the above-mentioned Figures, FIG. 5 is a view showing a foot system according to the present invention and a leg for a jointed leg type walking robot when the foot system lands on an uneven ground surface.

Figure 6:
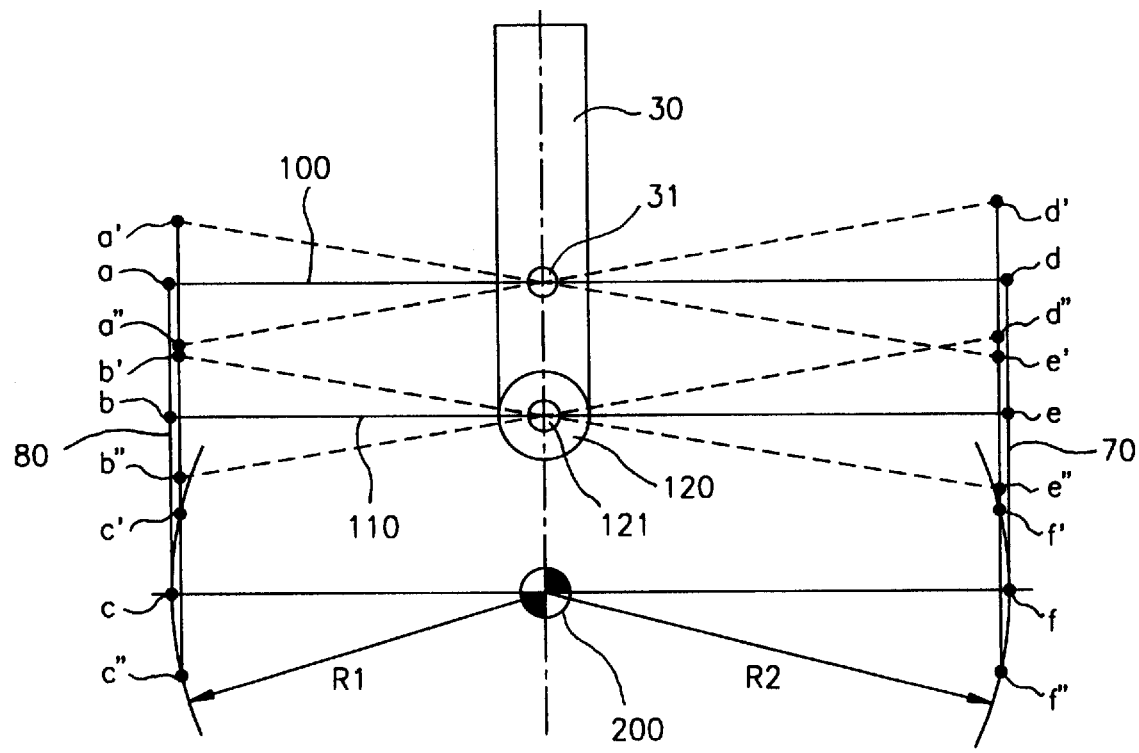
FIG. 6 is a trajectory diagram of the foot system for a jointed leg type walking robot according to the present invention.

As shown therein, the front and rear toes 70 and 80 of the foot system are adapted to effectively distribute and receive the landing shock on the foot system when the robot walks, and enable a stable landing operation even on an uneven ground surface. The front and rear toes 70 and 80 and the upper and lower parallel links 100, 101, and 110, 111 are arranged to follow a circular trajectory, as shown in FIG. 6, when the ankle 30 rotates about a rotation center 200 of the foot system. Namely, points a, b, and c of the rear toe 80 trace the trajectory points a', a", b', b", c' and c" with a radius of R1, and points d, e, and f of the front toe 70 trace the trajectory points d', d", c', c", f' and f" of the front toe 70 with a radius of R2. In addition, the rotation center 200 aligned with the axis of a shank 230 is positioned at the ground surface, and the landing positions of the front and rear toes 70 and 80 are not changed during the pivoting motion of the shank 230. Namely, since the rotation center of the shank 230 is positioned at the ground surface, an ankle joint pivot is unnecessary. The shock absorber 50 which is effective for absorbing the landing shock which occurs when the rear toe 80 of the foot system lands on the ground surface earlier than the front toe 70, is a commonly available type which can be easily obtained commercially.

The landing shock of a rear toe 80 is transmitted to the shock absorber 50 and is absorbed thereby. Here, since the vertical axis of the rear toe 80 of the foot system is always parallel with the vertical axis of the shock absorber 50 in cooperation with the parallelogram configuration of the upper and lower parallel links 100, 101 and 110, 111, the contact trajectory is positioned on a symmetrical line with the shock absorber axis. Therefore, since the shock absorber is applied with only the force in the symmetrical axis direction, it is possible to achieve a desired performance of the shock absorber 50. The piston rod of the shock absorber 50 is fully compressed by the body weight after landing. As the foot system rotates in the pitch direction of the shank 230 after landing, the piston rod of the shock absorber extends by the force of an internal spring (not shown) whose reaction force is very small.

With reference to FIGS. 7a through 7e, the operation of the foot system for a jointed leg type walking robot will now be explained in more detail.

FIG. 7A shows a landing phase of the robot. As shown therein, when the foot system lands on the ground surface, the rear toe 80 lands thereon earlier than the front toe 70. The shock absorber 50 is compressed by the force which occurs when the rear toe 80 is up, and then the abutment arm 90 on which the roller 60 of the shock absorber 50 slides is up thereby, whereby the landing shock on the robot foot is absorbed by the shock absorber 50. FIG. 7B shows the robot foot landed on the ground surface. Here, the rear toe 80 is decreasingly pivoted, and at the same time, the robot's weight is transferred to the front toe 70 landing on the ground surface. In FIG. 7C, the weight of the robot is evenly distributed to both the rear and front toes 80 and 70, so the foot system of the robot becomes stable on the ground surface. In more detail, the weight of the robot is distributed in proportion to the ratio of $F_1 \times L_1 = F_2 \times L_2$ and in reverse proportion to the lengths of lower links $L_1$ and $L_2$, where $F_1$ denotes the reaction force at the lower tip of the rear toe 80, $F_2$ denotes the reaction force at the lower tip of the front toe 70, $L_1$ is the length of the lower parallel link 110, 111 between the rear toe 80 and the pin 121, and $L_2$ is the length of the lower parallel link 110, 111 between the front toe 70 and the pin 121. Here, the total weight upon the robot foot system is $W = F_1 + F_2$.

FIG. 7C shows the foot system just before the body moves forwardly. As the shank 230 rotates forwardly about the pivot pin 121, the front toe 70 and the rear toe 80 become forwardly inclined in parallel with the shank 230 as shown in FIG. 7D, and the shock absorber 50 is decompressed in cooperation with the spring (not shown) disposed therein. When the rear toe 80 is lifted off the ground, the total weight of the robot is applied to the front toe 70. FIG. 7E shows the beginning state of the swing phase.

Figures 8A, 8B:
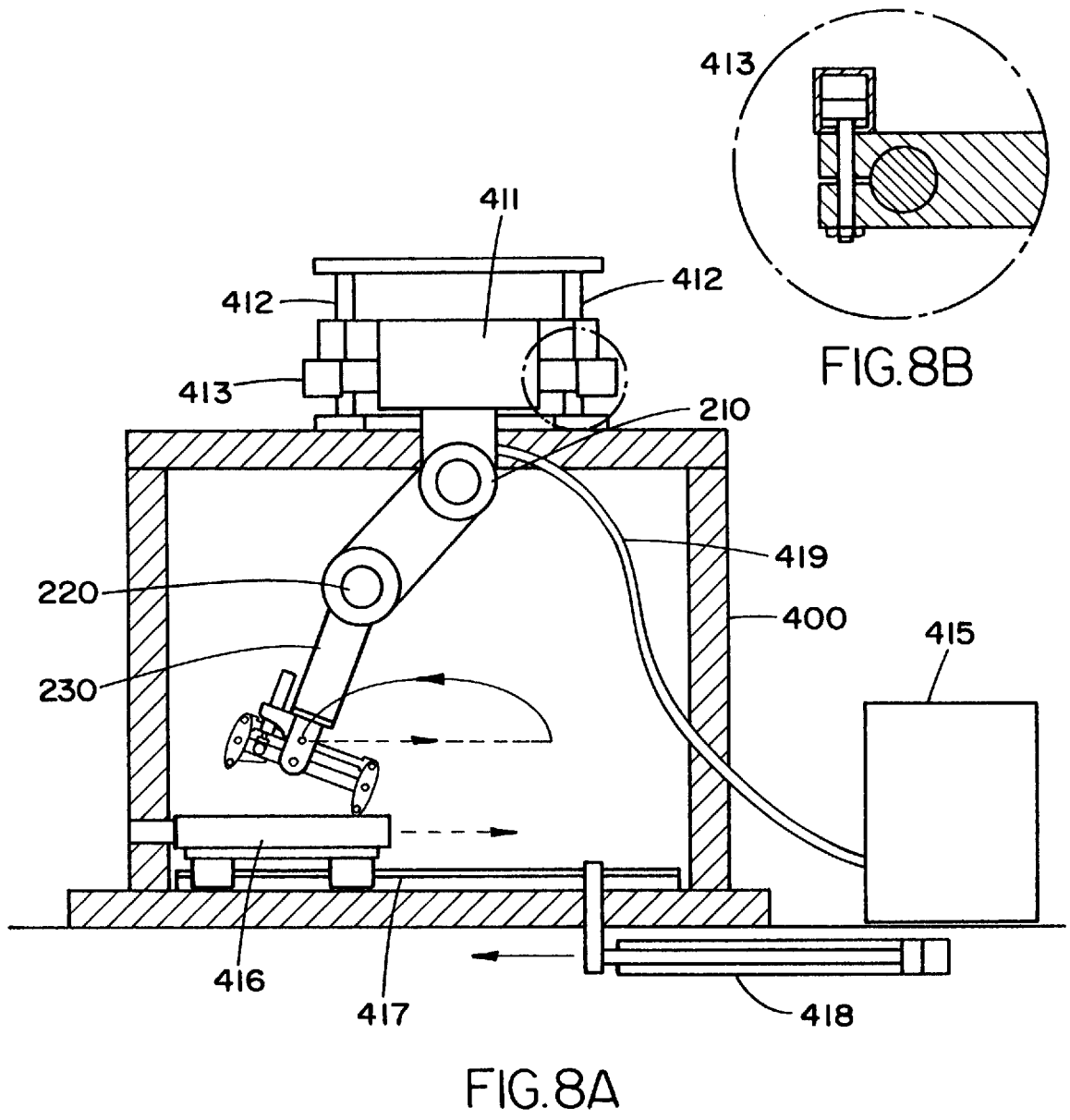
FIG. 8A is a view illustrating a gait experimenting apparatus employed for testing the foot system for a jointed leg type walking robot according to the present invention.
FIG. 8B is an enlarged sectional view of the hydraulic brake of FIG. 8A.

FIG. 8A shows the construction of a gait experimenting apparatus for testing the foot system for a jointed leg type walking robot according to the present invention. In the drawings, reference numeral 411 denotes a body, 412 a vertical guide for guiding the vertical movement of the body 411, 413 a hydraulic brake, shown in greater detail in FIG. 8B, 415 a hydraulic pressure source, 416 a movable foot plate, 417 a slider along which the foot plate 416 reciprocates, 418 a pneumatic cylinder, and 419 a hydraulic hose. Here, the operating oil is supplied to a hip joint 210 and a knee joint 220 through the hydraulic hose 419 from the hydraulic pressure source 415.

Figure 9:
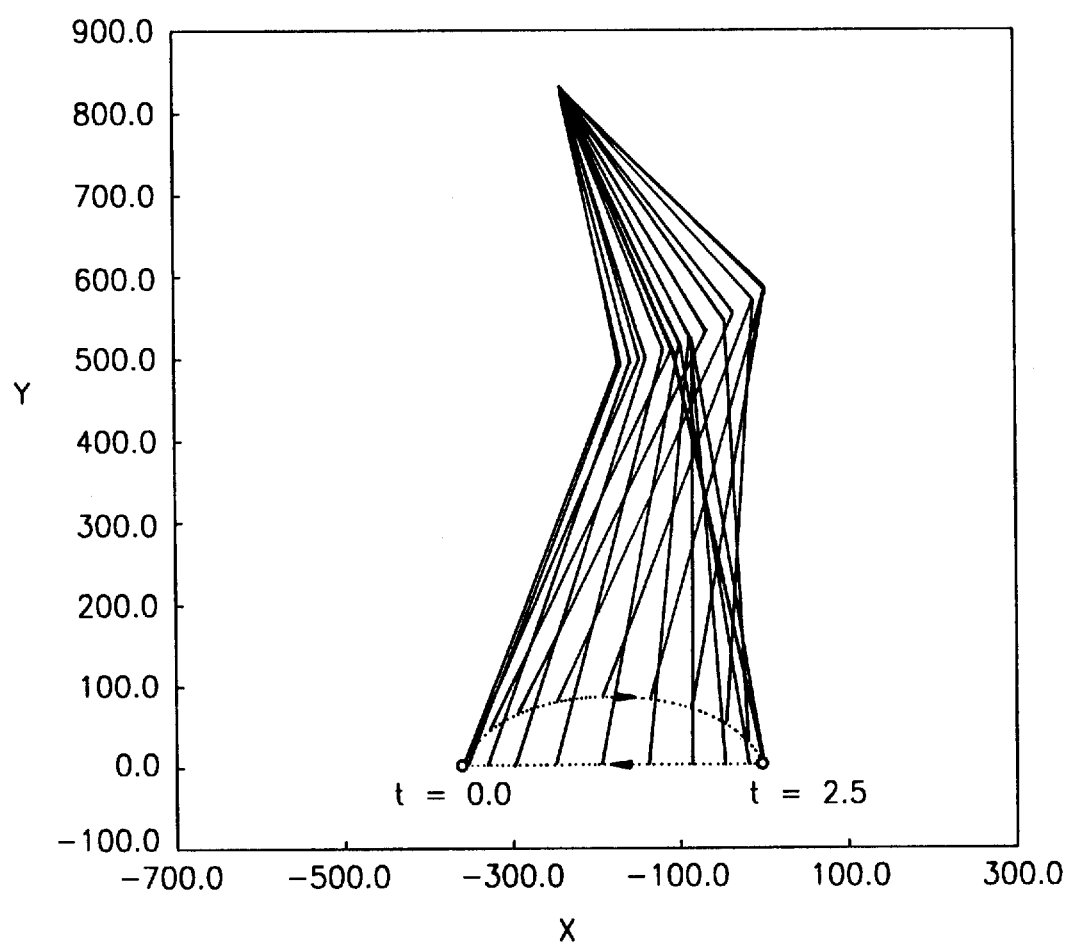
FIG. 9 is a trajectory plot of the foot and leg for a jointed leg type walking robot according to the present invention.

As shown in FIG. 8A, the foot system of the present invention was experimentally operated therein so as to obtain a moving trajectory of the foot, as shown in FIG. 9. While, the foot and leg system of the robot repeated the walking motion specified by the trajectory shown in FIG. 8A, the foot plate 416 reciprocated along the slider 417. In the landing phase during the experiment, the hydraulic brake 413 was not operated, so that the weight of the body 411 was applied to the leg system, and in the swing phase, the foot system was lifted up, and at the same time, the hydraulic brake 5 was operated, so that the body 411 was fixed to the vertical guide 412, and thus no weight was applied to the leg system.

For the experiment, the following conditions were given.

TABLE I

| [Spec of the leg system used] | |
| --- | --- |
| Length of upper leg | 350 mm |
| Total length of lower leg and foot | 450 mm |
| Weight of leg system itself | 50 kg |
| Total weight of body including leg and foot system | 75 kg |

Figure 1:
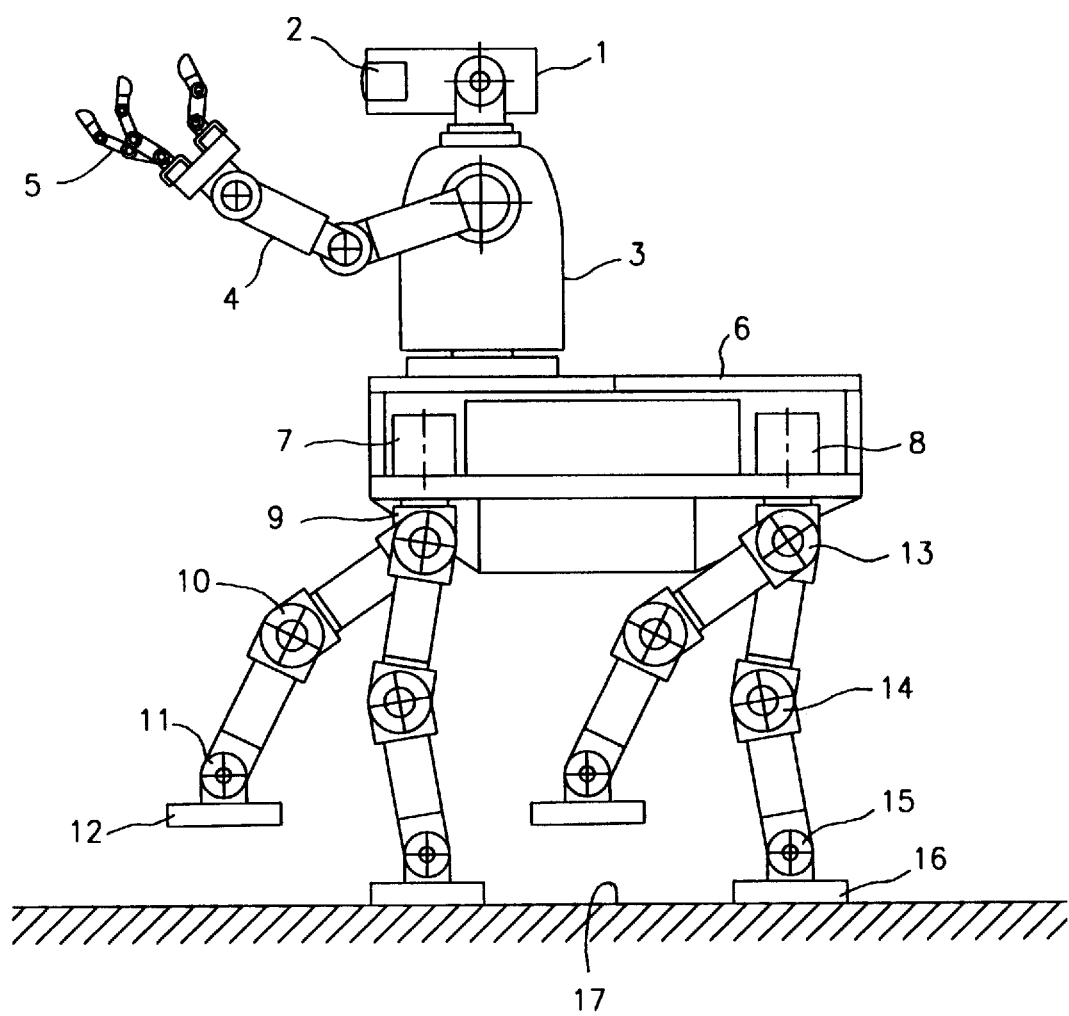
FIG. 1 is a view showing the construction of a conventional 4-legged jointed leg type 4-legged walking robot.
Figure 2A:
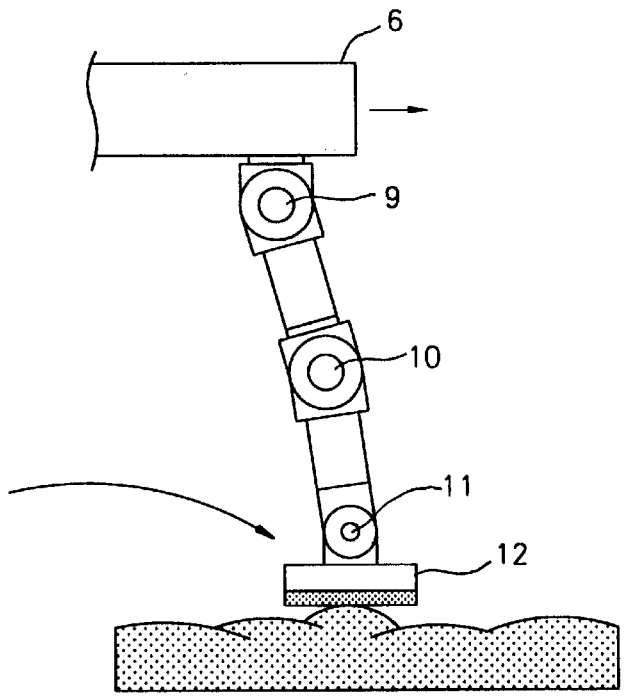
FIGS. 2A through 2D are views showing uneven ground operation of a conventional foot for a 4-legged jointed leg type walking robot.
Figure 2B:
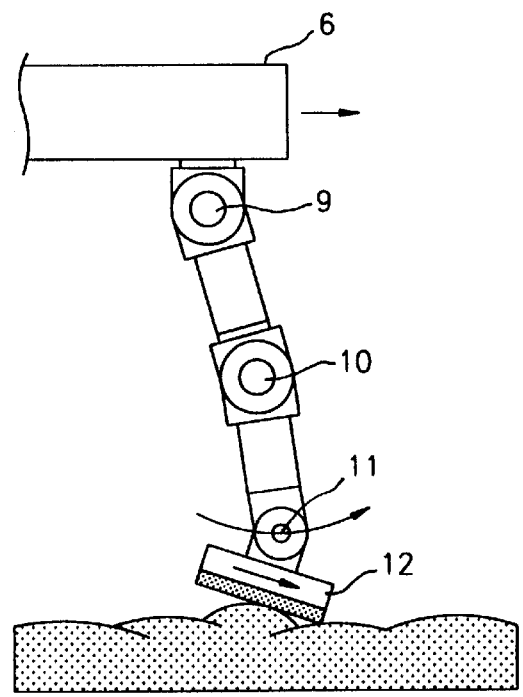
Figure 2C:
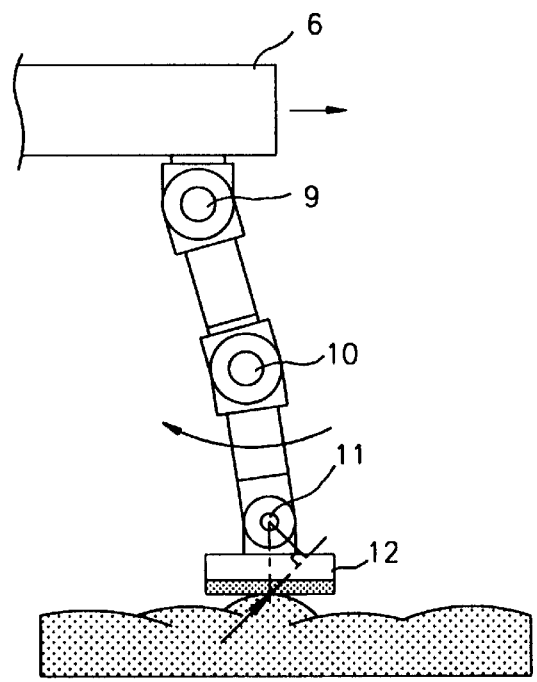
Figure 2D:
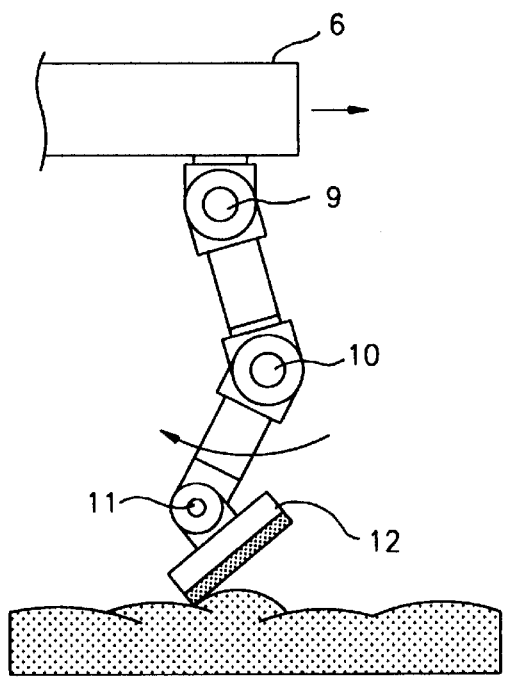
Figure 3:
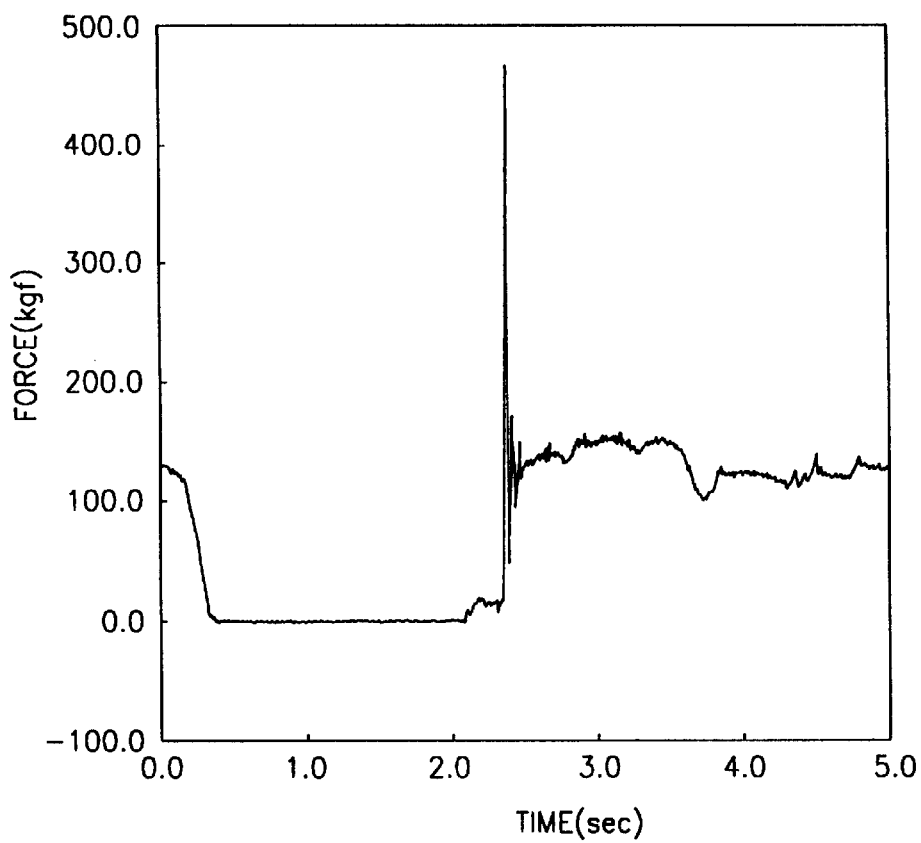
FIG. 3 is a graph showing the vertical reactive force on a conventional circular robot foot.
Figure 10:
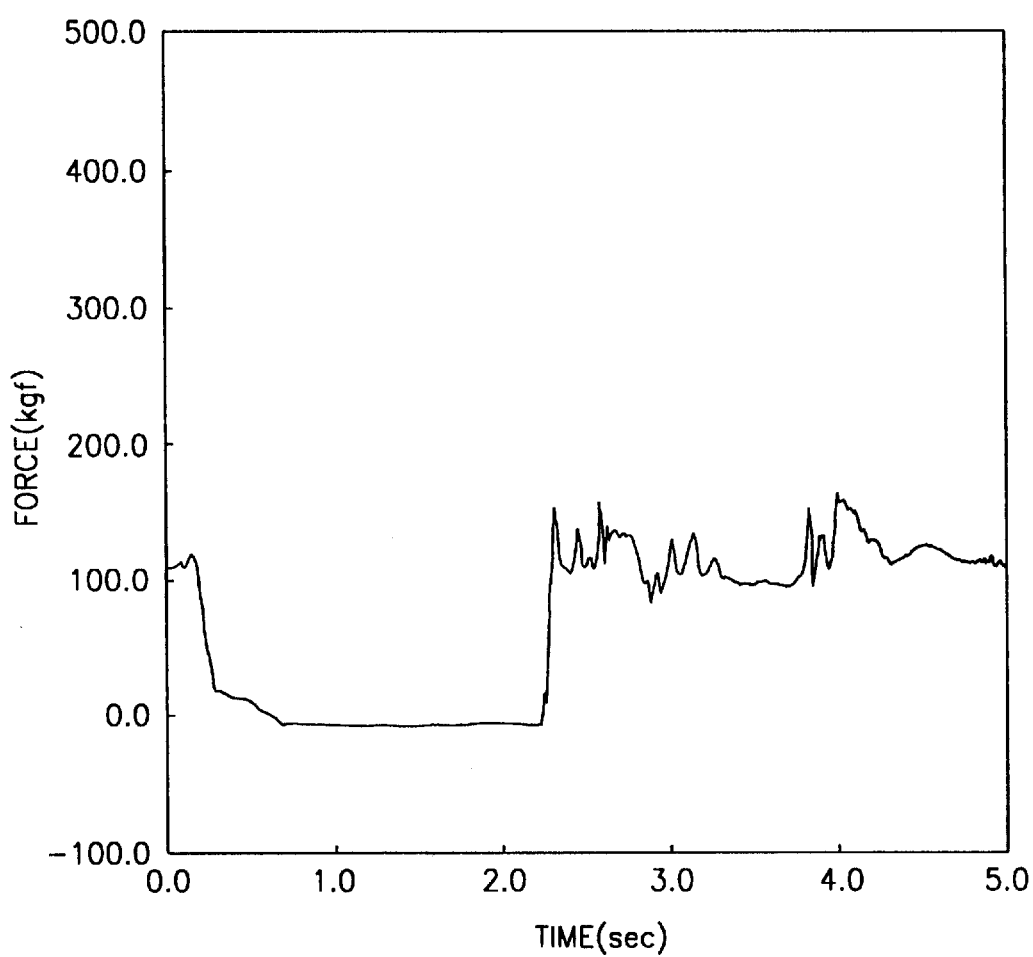
FIG. 10 is a graph showing the vertical reactive force of the foot system for a jointed leg type walking robot according to the present invention.

FIG. 10 is a graph showing the vertical reactive force of the foot system for a jointed leg type walking robot according to the present invention. As shown therein, it appeared that the vertical reactive force was significantly reduced as compared to the conventional art of FIG. 3. In more detail, the shock was more effectively absorbed by the new foot system of the present invention.

As described above, the foot system for a jointed leg type walking robot is advantageous in that the shock which occurs when the robot walks is effectively absorbed by the improved foot system, thereby reducing the working load on the hip joint and the knee joint, whereby the durability of the system can be enhanced, and the power consumption is significantly reduced.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A foot system for a jointed leg type walking robot, comprising:

a connection member disposed at a center portion of the foot system for being connected to a leg system, said connection member being cylindrical;

an ankle member being integral with the connection member below the same;

a shock absorber supporting member outwardly and integrally extending from an outer surface of the ankle member and having a vertical hole formed therethrough;

shock absorber means fixedly inserted into the hole formed in the shock absorber supporting member; and front and rear toes pivotally connected to the ankle member by a plurality of upper and lower parallel links.

2. The foot system of claim 1, wherein said connection member includes a threaded portion formed at an outer circumferential surface thereof for mating with a threaded portion of the shank.

3. The foot system of claim 1, wherein said ankle member includes a first pin pivotally inserted into a first horizontal hole formed at an upper portion thereof and a second pin pivotally inserted into a horizontal second hole formed at a lower portion thereof.

4. The foot system of claim 3, wherein said second hole includes an annular support portion formed therearound.

5. The foot system of claim 1, wherein said shock absorber includes a roller disposed at a lower end of a piston rod thereof, said roller and said piston rod being movable upwardly and downwardly.

6. The foot system of claim 1, wherein said rear toe includes an abutment member outwardly extended from a portion of an inner surface thereof and having a flat upper surface on which a roller of the shock absorber is slidable.

7. The foot system of claim 6, wherein said abutment member is integral with the rear toe.

8. The foot system of claim 1, said front toe includes a first pin pivotally inserted into a first hole formed at an upper portion thereof, and a second pin pivotally inserted into a second hole formed at an intermediate portion thereof.

9. The foot system of claim 1, wherein said upper parallel links are spaced apart about the ankle in parallel.

10. The foot system of claim 1, wherein said lower parallel links are spaced about the ankle in parallel.

11. The foot system of claim 9, wherein said spaced-apart upper links are each pivotally connected to a pin of the front toe, a pin of the ankle, and a pin of the front toe.

12. The foot system of claim 10, wherein said spaced-apart lower links are each pivotally connected to a pin of the front toe, a pin of the ankle, and a pin of the front toe.

13. The foot system of claim 1, wherein vertical center axes of the rear toe, the ankle, and the front toe are always parallel.

14. The foot system of claim 1, wherein said shock absorber includes a spring disposed therewithin.

* * * * *